UNITED STATES PATENT OFFICE.

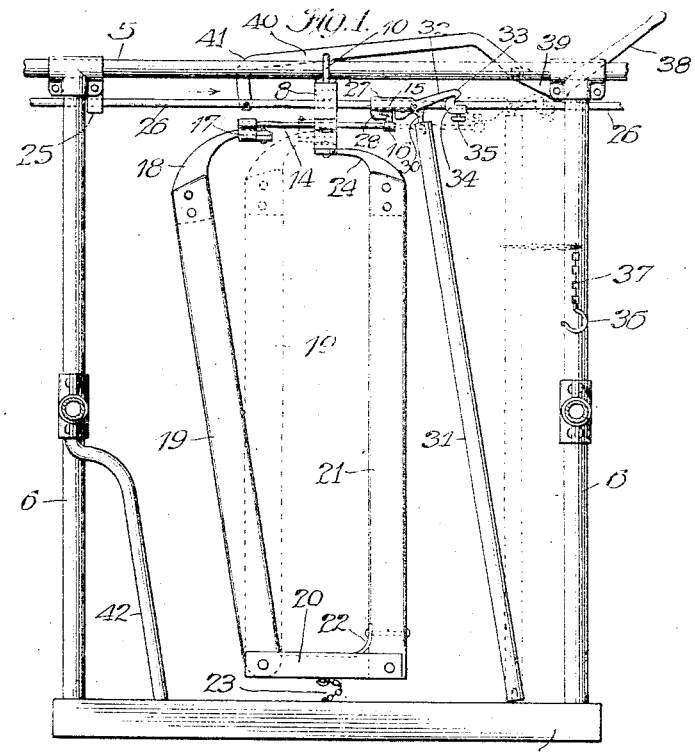
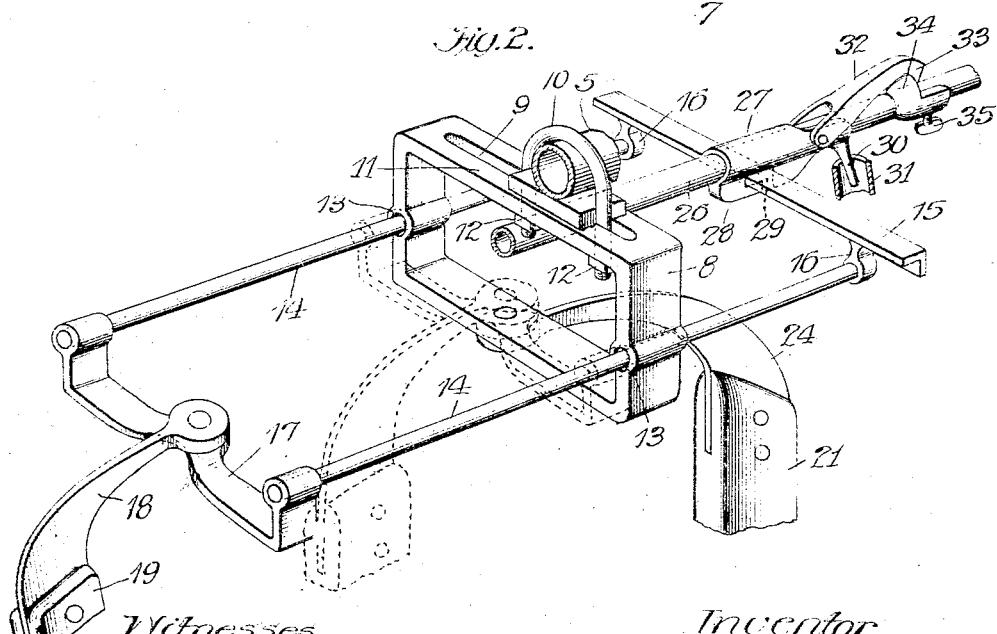

JEREMIAH C. FITZGERALD, OF KILBOURN, WISCONSIN, ASSIGNOR TO FELKER BROTHERS MANUFACTURING COMPANY, OF MARSHFIELD, WISCONSIN, A COPARTNERSHIP.

CATTLE-STANCHION.

1,161,802.  Specification of Letters Patent.  Patented Nov. 23, 1915.

Application filed January 2, 1914. Serial No. 813,338.

*To all whom it may concern:*

Be it known that I, JEREMIAH C. FITZ-GERALD, a citizen of the United States, residing at Kilbourn, in the county of Columbia and State of Wisconsin, have invented certain new and useful Improvements in Cattle-Stanchions, of which the following is a specification.

This invention relates to certain new and useful improvements in cattle stanchions, and has particular reference to devices for an apparatus of this character comprising a pair of stanchions or clamping bars located vertically in parallelism with one another and at one end of the several stalls or compartments for cows or animals, and mounted for rotary movement in a vertical plane, and it consists in certain peculiarities of the construction, novel arrangement and operation of the various parts thereof, as will be hereinafter more fully set forth and specifically claimed.

The main and general object of the invention is to provide simple and readily operable means, whereby the animals are secured and quickly released one at a time or simultaneously in case of emergency, or otherwise.

Other objects and advantages of the invention will be disclosed in the subjoined description and explanation.

In the accompanying drawing, which serves to illustrate an embodiment of the invention—Figure 1 is a view in elevation, showing a complete stanchion and illustrating by dotted lines the positions some of the parts will occupy when the animal's neck is clamped between the stanchion or neck bars, and by continuous lines the positions the parts will occupy when the animal's neck is released, and Fig. 2 is an enlarged perspective view of the upper portion of the stanchion.

Like numerals of reference refer to corresponding parts throughout the different views of the drawing.

In the present instance the stanchions or clamping members for necks of the cows or animals are shown as being mounted at their upper portions on a horizontally disposed rod 5, which is illustrated as being supported by means of uprights 6 extended from a horizontally located beam or support 7, which supporting structure may be located at that end of the several stalls in which the mangers are located, and which may be termed the head ends of the stalls, at which ends it is desirable to secure the heads of the animals in such a manner that the same may have limited or comfortable movement of their heads, yet so that they cannot leave the stalls until released.

Mounted transversely on the supporting bar or rod 5, and about midway between the uprights 6, is a hanger 8, which is preferably rectangular in shape and frame-like in form, as is clearly shown in Fig. 2 of the drawing. The upper portion of the hanger 8 is provided with a slot 9, through which are extended the ends of a bar or link 10, which strides the supporting rod 5, between which and the upper surface of the hanger 8, may be placed a block 11, to fill up the space between the link or bow 10 and the upper part of the hanger. The ends of the bow 10 have fitted thereon nuts 12, which will rest against the lower surface of the upper part of the hanger 8, and thus securely hold the latter in place on the supporting rod. By providing the hanger 8 with the slot 9, it is evident that by loosening the nuts 12 the hanger may be adjusted transversely with respect to the supporting bar or rod 5, as may be desired. At each of its ends the hanger 8 is provided with an opening 13, through each of which is horizontally and movably extended a rod 14, which rods are connected at one of their ends by means of an angle-bar 15, from which an apertured extension 16, near each of its ends, depends, for the reception of the rods 14, the other ends of which rods are transversely connected by a cross-piece 17, to the central portion of which is pivotally secured one end of an arm 18, the other end of which is secured to the upper end of a stanchion or neck-bar 19, the lower end of which stanchion is pivotally secured to a brace-bar 20, which is preferably made of channel iron and has at one of its ends an opening to receive the lower end of said stanchion. The other end of the brace-bar 20 is provided with an opening in which the lower end of another stanchion or neck bar 21, is located and secured. The brace-bar 20 has extended upwardly a projection 22, which is secured to the lower portion of the stanchion 21, so as to hold the same rigidly with respect to the brace-bar, which brace-bar is loosely connected by means of a chain 23, to the beam or support 7, so as to permit of swinging movement of the brace-bar and stanchions.

Pivotally mounted at one of its ends to the central portion of the lower part of the hanger 8, is an arm 24, which has its other end secured to the upper part of the stanchion or neck bar 21. Horizontally mounted on the upper portion of the supporting structure by means of hangers 25, is a slidable bar 26, which extends through the hanger 8, and may be moved back and forth by any suitable means. On this sliding bar is loosely mounted a sleeve 27, which has a depending portion 28, provided with a transverse opening 29, of a size and shape to receive and hold the cross piece 15, of the sliding frame, which consists of the rods 14, and cross-pieces 15 and 17, at the ends thereof. At one of its ends the sleeve 27, is provided with a downwardly extended arm 30 to fit in or loosely engage the upper end of the stop-bar or rod 31, which is loosely mounted at its lower end on the beam 7, or a suitable base support.

Pivotally mounted at one of its ends to the sleeve 27, and near that end thereof on which the projection or arm 30 is located, is a dog 32, the hooked free end 33 of which is adapted to engage a collar or catch 34, which is adjustably fixed on the sliding rod 26, by means of the thumb-screw 35 extended through its lower portion. A hook 36, attached to one of the uprights 6, by means of a chain 37, may be employed to hold the stop-bar or rod 31 against movement when the animal's neck is clamped between the stanchion or neck bars. This stop-bar is employed to prevent the animal placing its head between the neck-bar 21, and the upright 6, adjacent thereto, or, in other words, to cause it to place its head between the neck-bars.

From the foregoing and by reference to the drawing, it will be readily understood and clearly seen that when the parts are in the positions shown by the continuous lines in Fig. 1, the animal can pass its head between the bars 19 and 21, when by sliding the rod 26 in the direction indicated by the arrow, the bar 19 will be moved to the position indicated by the dotted lines, in which operation the hooked end 33 of the dog 32 engaging the catch 34 will cause the sliding frame, to which the bar 19 is connected, to be moved to about the position shown by dotted lines in Fig. 1 of the drawing, and at the same time the stop-bar 31 will be moved to about the position shown by dotted lines in said figure, where said stop-bar may be fastened by means of the hook 36, on the chain 37, and thus prevent outward movement of the bar 19 from the bar 21. To release the animal it is only necessary to disengage the dog 32 from the catch 34, when the sleeve 27 and sliding frame may be moved in the proper direction to separate the stanchions or neck bars.

As a convenient means for moving the sliding bar 26 back and forth and for shifting the movable neck-bar and movable stop-bar, a bell crank lever is employed, which is fulcrumed on the upper portion of the supporting structure, consisting of the uprights 6, and the elevated support 5, the longer arm 38 of which bell crank lever furnishes a handle by means of which said lever may be operated, and the shorter arm 39 is pivotally connected to one end of a link 40, which has an elbow 41 near each of its ends. That end of the link 40 opposite the end thereof which is connected to the arm 39, is pivotally connected to the sliding bar 26, so that when the bell crank lever comprising the arms 38 and 39 is turned on its fulcrum the bar 26 will be slid back and forth so as to operate the parts connected thereto. When the arm 38 of said lever is turned downwardly to the limit of its movement and the door 26 is moved forwardly in the direction indicated by the arrow, so as to position the parts as shown by dotted lines in Fig. 1, it is apparent that said parts, as well as said bar, will be locked against opposite movement, and that thus all of the neck-bars may be secured in their clamping or holding positions until it is desired to separate them in order to release the animals, which may be done by turning the arm 38 of the bell crank lever upwardly to about the position shown in Fig. 1 of the drawing. To prevent the animal from placing its head between the neck-bar 19, and the standard 6 adjacent thereto, a stop-bar 42, connected at its upper end to said standard and at its lower portion to the beam or support 7, may be employed.

Having thus fully described my invention, what I claim as new and desire to secure by Letters Patent is—

1. In a stanchion, the combination with an elevated support, of a bar slidably mounted near said support, a sleeve loosely mounted on said bar, a catch adjustably mounted on said bar, a connection carried by the sleeve to engage said catch, a pair of neck-bars mounted for back and forth adjustment at their upper portions with regard to said support, and a connection between one of the neck-bars and said sleeve.

2. In a stanchion, the combination with an elevated support, of a bar slidably mounted near said support, a sleeve loosely mounted on said bar, a catch adjustably mounted on said bar, a connection between the sleeve and said catch, a pair of neck-bars loosely connected at their upper portions to said support, and horizontal means to move the sleeve and one of the neck bars in unison.

3. In a stanchion, the combination with an elevated support, of a bar slidably mounted near said support, a sleeve loosely mounted on said bar, a catch adjustably mounted on said bar, a connection between the sleeve and said catch, said connection consisting of a dog loosely connected at one end to the sleeve and having means to engage the catch, a pair of neck-bars loosely connected at their upper portions to said support, and horizontal means to move the sleeve and one of the neck bars in unison.

4. In a stanchion, the combination with an elevated support, of a bar slidably mounted near said support, a sleeve loosely mounted on said bar, a catch adjustably mounted on said bar, a connection carried by the sleeve to engage said catch, an upright stop-bar loosely mounted at its lower end and loosely engaging said sleeve at its upper end, a pair of neck-bars mounted for back and forth adjustment at their upper portions to said support, and a connection between one of the neck-bars and said sleeve.

5. In a stanchion, the combination with an elevated support, of a hanger mounted thereon, an extension slidably mounted on said hanger, a neck-bar pivotally connected at its upper end to said extension and loosely connected at its other end to a second neck-bar, said second neck-bar pivotally connected at its upper end to said hanger, a bar slidably mounted near said support, a sleeve movable longitudinally on the sliding bar and connected to said extension, and means to fix and release said sleeve to and from said bar.

6. In a stanchion, the combination with an elevated support, of a transversely adjustable hanger mounted thereon, an extension slidably mounted on said hanger, a neck-bar pivotally connected at its upper portion to said extension and loosely connected at its other end to a second neck bar, said second neck-bar pivotally connected at its upper end to said hanger, a bar slidably mounted near said support, a sleeve movable longitudinally on the sliding bar and relatively transversely adjustably connected to said extension, and means to fix and release said sleeve to and from said bar.

7. In a stanchion, the combination of an elevated support, with a bar slidably and horizontally mounted near said support, a pair of neck-bars loosely connected at their upper portions to said support, a stop-bar loosely supported by the first named bar, and means to reciprocate the slidable bar whereby one of the neck-bars and said stop-bar will be moved in unison.

8. In a stanchion, the combination of an elevated support, with a bar slidably mounted near said support, a pair of neck-bars loosely connected at their upper portions to said support, a connection between one of the neck-bars and the slidable bar, a stop-bar loosely supported by the first named bar, a suitably fulcrumed lever having connection with the slidable bar to move it back and forth and to lock the same against movement.

9. In a stanchion, the combination of an elevated support, with a bar slidably mounted near said support, a pair of neck-bars loosely connected at their upper portions to said support, a stop-bar loosely supported by the first named bar, and means connecting one of the neck-bars and said stop-bar whereby they may be moved independently of the slidable bar.

10. In a stanchion, the combination with an elevated support, of a bar slidably mounted near said support, a sleeve loosely mounted on said bar, a catch adjustably mounted on said bar, a connection carried by the sleeve to engage said catch, a pair of neck bars mounted at their upper portions to said support, and a connection between one of the neck bars and the said sleeve.

11. In a stanchion, the combination of an elevated support, with a horizontal bar slidably mounted near the same, a suitably fulcrumed lever connected to said support to reciprocate the same, a plurality of sleeves slidably mounted on said bar, a plurality of catches detachably mounted on the bar, a dog loosely connected to each of said sleeves and adapted to engage said catches, and a plurality of pairs of neck-bars loosely connected at their upper portions to said support and to said sleeve.

12. A stanchion equipment having an overhead actuating rod and a swinging stop-bar; in combination with a coupling mechanism comprising a sleeve slidable on said actuating rod, means connecting the sleeve and stop bar, a collar adjustably secured to the actuating rod, and a dog carried by the sleeve having locking engagement with said collar.

13. A stanchion equipment having an overhead actuating rod and a swinging stop-bar; in combination with a coupling mechanism comprising a sleeve slidable on said actuating rod, a finger depending from said sleeve engageable with the upper end of the stop-bar whereby movement is imparted to the same, a collar loosely mounted upon the actuating rod, means for fastening said collar to the rod, and a dog in pivotal union with the sleeve, having a head adapted for locking engagement with the collar.

14. In a stable equipment, the combination of a shiftable stop-bar, a swinging stanchion member, a fixed stanchion member coöperating with said swinging stanchion member, means connecting the stop bar and the swinging stanchion member, an actuating rod, and a detachable coupling mechanism connecting said actuating rod with said means connecting the stop-bar and the swinging stanchion member.

15. In a stable equipment, the combination of a shiftable stop-bar, a swinging stanchion member, a fixed stanchion member coöperating with said swinging stanchion member, and means connecting the stop-bar with the swinging stanchion member, a slidable actuating rod, and a dog carried by the means that connect the stop bar with the swinging stanchion member, said dog being capable of locking engagement with the actuating rod.

16. In a stable equipment, the combination of a shiftable stop-bar, a swinging stanchion member, a fixed stanchion member coöperating with said swinging stanchion member, an actuating rod for the stanchion member, a sleeve slidably mounted thereon, a dog carried by the sleeve, a collar adjustably mounted upon the actuating rod, said dog being capable of locking engagement with said collar, means connecting the sleeve with the stop bar and means connecting the sleeve with the swinging stanchion member.

17. A stanchion for animals consisting of two parallel arms hinged together at one end and opening and closing at the opposite end, means secured to each end of the stanchion for connecting the stanchion to the stall, a locking means connected to one of the stanchion arms by an oscillating joint, a sure stop bar connected to the locking means by an oscillating joint.

JEREMIAH C. FITZGERALD.

Witnesses:
 CHAS. C. TILLMAN,
 A. S. PHILLIPS.